(12) United States Patent
Cheng et al.

(10) Patent No.: US 9,582,463 B2
(45) Date of Patent: Feb. 28, 2017

(54) HETEROGENEOUS INPUT/OUTPUT (I/O) USING REMOTE DIRECT MEMORY ACCESS (RDMA) AND ACTIVE MESSAGE

(71) Applicant: Intel Corporation, Santa Clara, CA (US)

(72) Inventors: Shiow-Wen Wendy Cheng, Portland, OR (US); Robert J. Woodruff, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/564,893

(22) Filed: Dec. 9, 2014

(65) Prior Publication Data

US 2016/0162439 A1 Jun. 9, 2016

(51) Int. Cl.
| | | |
|---|---|---|
| G06F 13/28 | (2006.01) | |
| G06F 3/00 | (2006.01) | |
| G06F 5/00 | (2006.01) | |
| G06F 15/173 | (2006.01) | |

(52) U.S. Cl.
CPC ........ G06F 15/17331 (2013.01); G06F 13/28 (2013.01)

(58) Field of Classification Search
None
See application file for complete search history.

(56) References Cited

U.S. PATENT DOCUMENTS

| | | |
|---|---|---|
| 6,226,680 B1 | 5/2001 | Boucher et al. |
| 2002/0199058 A1 | 12/2002 | Ofek |
| 2004/0263521 A1* | 12/2004 | Booth, Jr. ............. G06F 9/3879 345/520 |
| 2008/0101770 A1 | 5/2008 | Commons et al. |
| 2008/0313364 A1 | 12/2008 | Flynn et al. |
| 2009/0187713 A1 | 7/2009 | Zedlewski et al. |

(Continued)

FOREIGN PATENT DOCUMENTS

| | | |
|---|---|---|
| JP | 2006099802 A | 4/2006 |
| WO | 2015/041653 A1 | 3/2015 |
| WO | 2016/094001 A1 | 6/2016 |

OTHER PUBLICATIONS

"Xeon Phi", encyclopedia entry, 8 pages, retrieved from http://en.wikipedia.org/wiki/Xeon_Phi, on Nov. 16, 2014, Wikipedia.

(Continued)

*Primary Examiner* — David E Martinez
(74) *Attorney, Agent, or Firm* — Alpine Technology Law Group LLC

(57) ABSTRACT

Methods and apparatus to provide heterogeneous I/O (Input/Output) using RDMA (Remote Direct Memory Access) and/or Active Message are described. In an embodiment, information is exchanged between an embedded system and a storage device via a source device. The embedded system and the storage device exchange information over a first link and a second link instead of a third link in response to a transfer rate of the first link (coupled between the embedded system and the source device) being faster than a transfer rate of the second link (coupled between the source device and the storage device). The third link is capable to directly couple the embedded system and the storage device. Other embodiments are also disclosed and claimed.

22 Claims, 14 Drawing Sheets

(56) References Cited

U.S. PATENT DOCUMENTS

| | | | |
|---|---|---|---|
| 2010/0325334 | A1 | 12/2010 | Tsai et al. |
| 2012/0284369 | A1 | 11/2012 | Fishgait et al. |
| 2013/0024645 | A1 | 1/2013 | Cheriton et al. |
| 2013/0238855 | A1 | 9/2013 | Satran et al. |
| 2013/0275631 | A1 | 10/2013 | Magro et al. |
| 2014/0055467 | A1* | 2/2014 | Bittner ................. G06F 3/14 345/520 |
| 2014/0164549 | A1 | 6/2014 | Cudak et al. |
| 2015/0081945 | A1 | 3/2015 | Cheng et al. |
| 2015/0169238 | A1* | 6/2015 | Lee ................. G06F 12/0871 711/103 |
| 2015/0347349 | A1* | 12/2015 | Raindel ............. G06F 15/17331 710/308 |

OTHER PUBLICATIONS

Newburn, Chris J., et al, "Offload Compiler Runtime for the Intel Xeon Phi Coprocessor", article, Feb. 8, 2013, 12 pages, Intel Corporation, Santa Clara, CA.

"The Message Passing Interface (MPI) standard", Internet article, retrieved from http://www.mcs.anl.gov/research/projects/mpi/ on Nov. 16, 2014, MPI.

"ROMIO: A High-Performance, Portable MPI-IO Implementation" blog entery, retrieved from http://www.mcs.anl.gov/research/projects/romio/index-archived.html on Nov. 16, 2014, Romio.

"Active Message", encyclopedia entry, 2 pages, retrieved from http://en.wikipedia.org/wiki/Active_message on, Nov. 16, 2014, Wikipedia.

"Network File System", encyclopedia entry, 7 pages, retrieved from http://wn.wikipedia.org/wiki/Network_File_System, on Nov. 16, 2014.

"Lustre (file system)", encyclopedia entry, 11 pages, retrieved from http://en.wikipedia.org/wiki/Lustre_(file_system), on Nov. 16, 2014.

"Intel Xeon Phi Product Family", online catalog, 6 pages, retrieved from http://www.intel.com/content/www/us/en/processors/xeon/xeon-phi-detail.html?cid=sem425p177g-c&gclid=Cj0KEQiAs6GjBRCy2My09an6uNIBEiQANfY4zH%E2%80%A6, on Nov. 16, 2014.

International Preliminary Report on Patentability received for International Application No. PCT/US2013/060634, mailed on Mar. 31, 2016, 6 pages.

International Search Report and Written Opinion received for International Application No. PCT/US2013/060634, mailed on Jun. 18, 2014, 8 pages.

Wikipedia, "Lustre (file systems)", retrieved from <https://en.wikipedia.org/wiki/index/php?title=Lustre_(file)_system)&oldid=559034352>, retrieved on Jun. 8, 2016, 9 pages.

Burrows, Mike, "The Chubby Lock Services for Loosely-Coupled Distributed Systems", Google Inc., OSDI'06: Seventh Symposium on Operating System Design and Implementation, Seattle, WA, Nov. 2006, 16 pages.

Wikipedia, "POSIX", retrieved from <http://en.wikipedia.org/w/index.php?title=POSIX&oldid=552175757>, retrieved on Jun. 8, 2016, 7 pages.

Wikipedia, "Expansion Card" retrieved from <http://en.wikipedia.org/w/index.php?title=Expansion_card_&oldid=556022170>, retrieved on Jun. 8, 2016, 5 pages.

Wikipedia, "CacheFS", retrieved from <http://en.wikipedia.org/w/index.php?title=CacheFS&oldid=544615612>, retrieved on Jun. 8, 2016, 4 pages.

Wikipedia, "Network File System", retrieved from <http://en.wikipedia.org/w/index.php?title=Network_File_System&oldid=553868858>, retrieved on Jun. 8, 2016, 6 pages.

Wikipedia, "Distributed Lock Manager", retrieved from <http://en.wikipedia.org/w/index.php?title=Distributed-lock-manager&oldid=552456190>, retrieved on Jun. 8, 2016, 5 pages.

Office Action issued in U.S. Appl. No. 14/122,994, mailed on Jan. 25, 2016, 10 pages.

"Ways to Automatically Disable Wireless Network Connection when Local Area Connection is Enabled", by Raymond.cc, downloaded on Oct. 7, 2016 from https://www.raymond.cc/blog/auto-disable-wireless-when-lan-connected, appears to have been first posted Oct. 2011, 12 pages.

International Search Report and Written Opinion received for International Application No. PCT/US2015/059729, mailed on Feb. 18, 2016.

\* cited by examiner

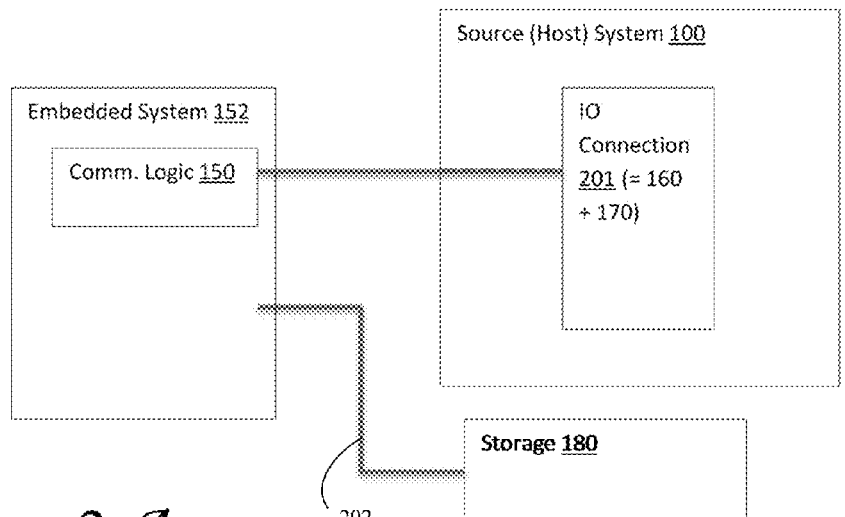
FIG. 2-A
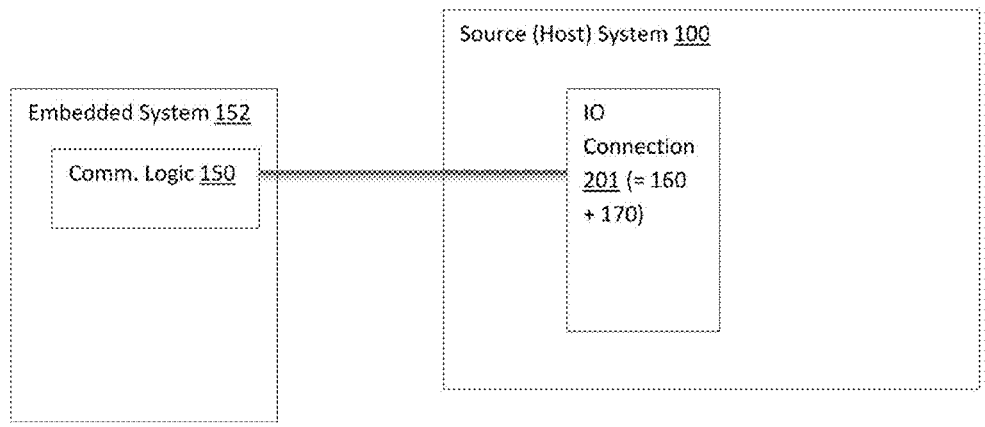
FIG. 2-B

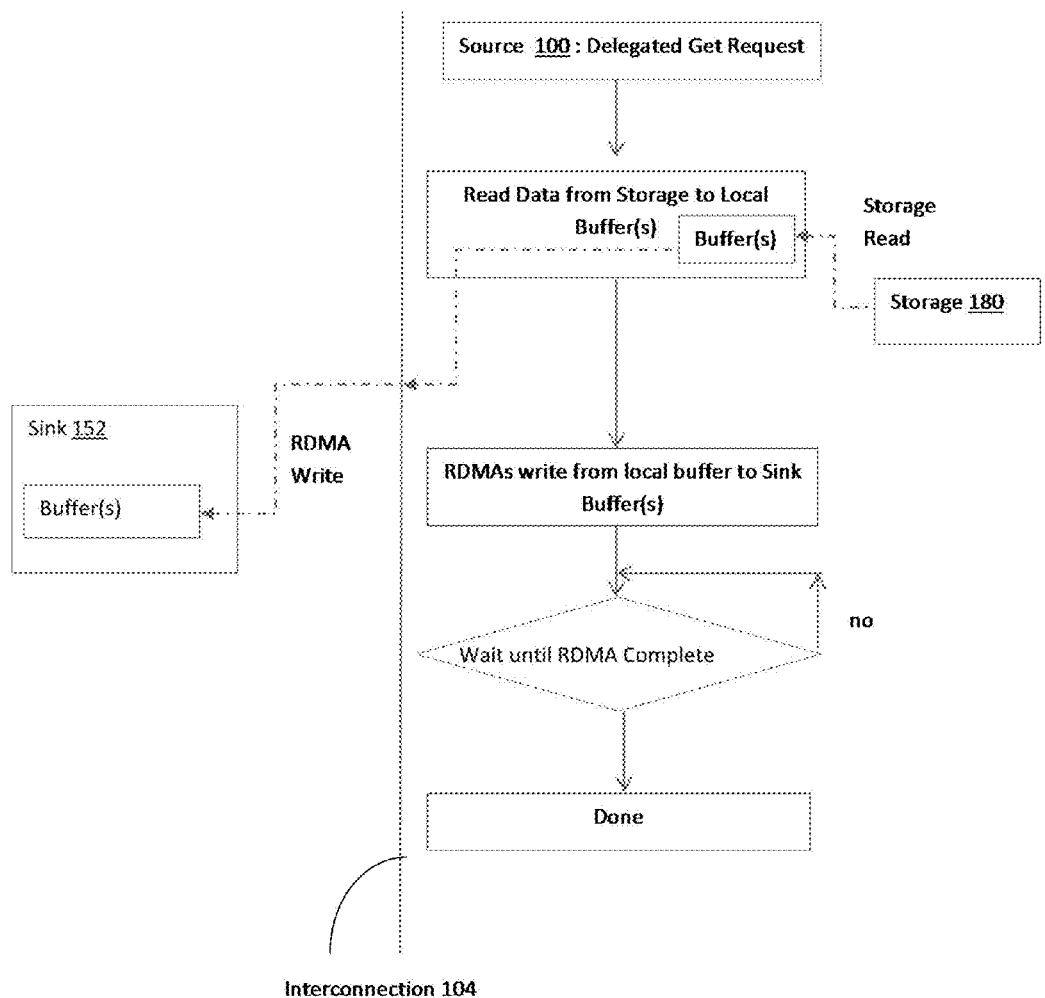
FIG. 3-A

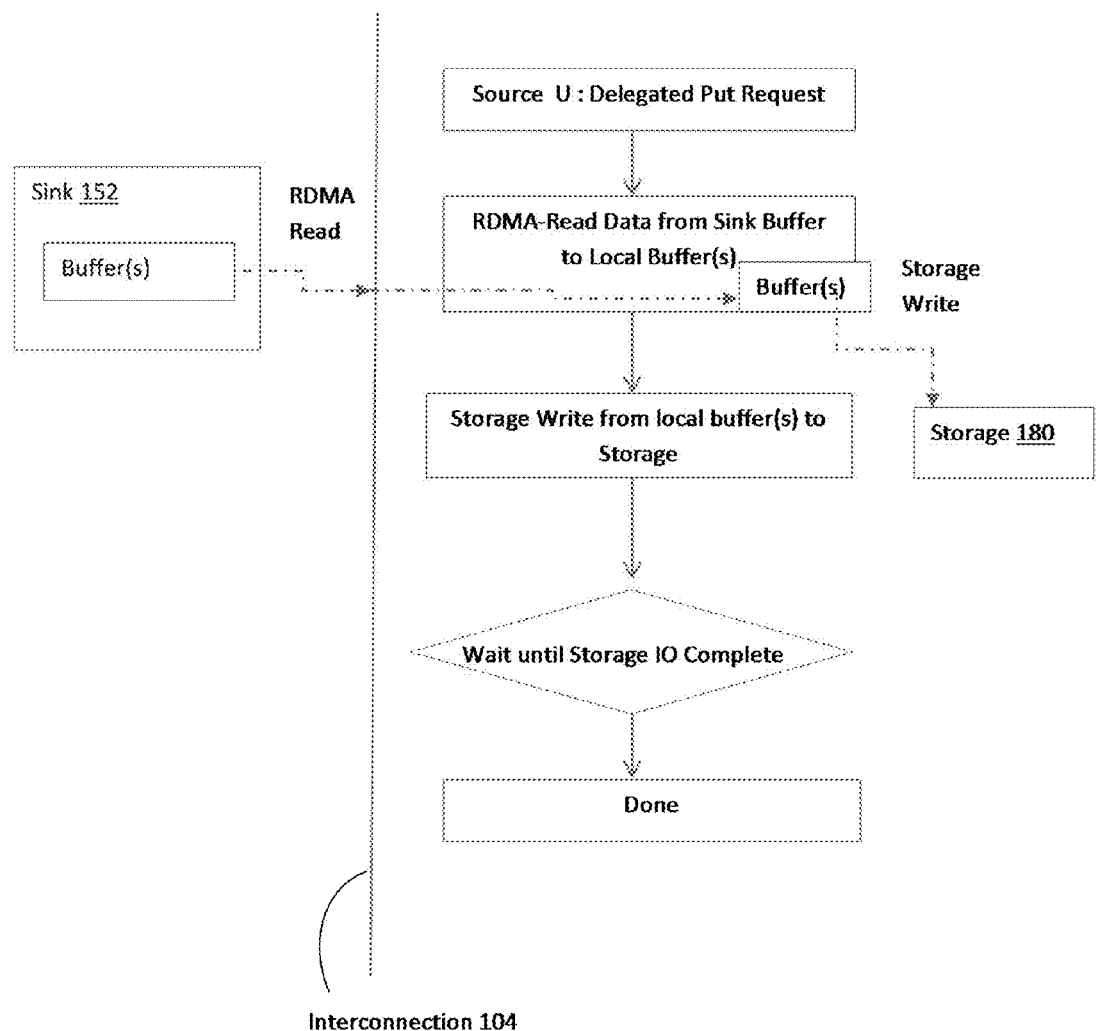
FIG. 3-B

HETEROGENEOUS INPUT/OUTPUT (I/O) USING REMOTE DIRECT MEMORY ACCESS (RDMA) AND ACTIVE MESSAGE

FIELD

The present disclosure generally relates to the field of electronics. More particularly, some embodiments generally relate to heterogeneous IO (Input/Output) using RDMA (Remote Direct Memory Access) and/or Active Message.

BACKGROUND

Generally, embedded platforms such as a Graphics Processing Unit (GPU) or digital consumer electronics may have relatively very limited IO (Input/Output) capabilities or bandwidth compared to non-embedded platforms (such as a traditional work station or desktop computer). Hence, moving data between embedded systems and an external storage device (for example a hard disk drive) can be cumbersome. Moreover, conventional solutions may involve bulky and/or expensive storage protocols (or cluster file systems), and may generate disappointing performance results with high development cost.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 1, 2-A, 2-B, and 11-13 illustrate block diagrams of embodiments of computing systems, which may be utilized to implement various embodiments discussed herein.

FIGS. 3-A, 3-B, and 4-10 illustrate flow diagrams of methods to perform various operations in accordance with some embodiments.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

As discussed above, embedded platforms may have very limited IO (Input/Output or I/O) capabilities. Hence, moving data between these systems and their external storage can be cumbersome. Conventional solutions may involve bulky and/or expensive storage protocols (or cluster file systems), and may generate disappointing performance results with high development cost. Accordingly, light-weight solutions with high performance that can be easily tailored to fit into a platform's host system (and runtime environment) are in high demands by many users and ISV/IHV (Independent Solution Vendor/Independent Hardware Vendors).

To this end, some embodiments provide heterogeneous IO (Input/Output; also referred to herein as "I/O" interchangeably) using RDMA (Remote Direct Memory Access) and/or Active Message over a communication network (e.g., Ethernet or InfiniBand®). As discussed herein, an "Active Message" generally refers to a messaging object capable of performing processing on its own. In an embodiment, RDMA (Remote Direct Memory Access) and active message(s) are used to achieve the goal of building the described data transfer solution (i.e., heterogeneous paths 150 plus 201 discussed with reference to FIG. 2) that does not require any particular storage protocol and/or any particular file system support. This can sustain competitive performance results with the flexibility to fit into many different run-time environments with minimum development cost.

Additionally, heterogeneous and adaptive solutions are provided in some embodiments. For example, without the pre-defined protocol constraints, the data can be freely redirected to different storage mediums using different formats. Data can also be retrieved and converted back to its original forms more easily. In some embodiments, techniques discussed herein may be used to enhance IO capabilities of embedded systems such as portable devices (e.g. digital consumer electronics) or coprocessor accelerators (e.g., Intel® Corporation's Xeon® Phi™ product family).

Figure 1:
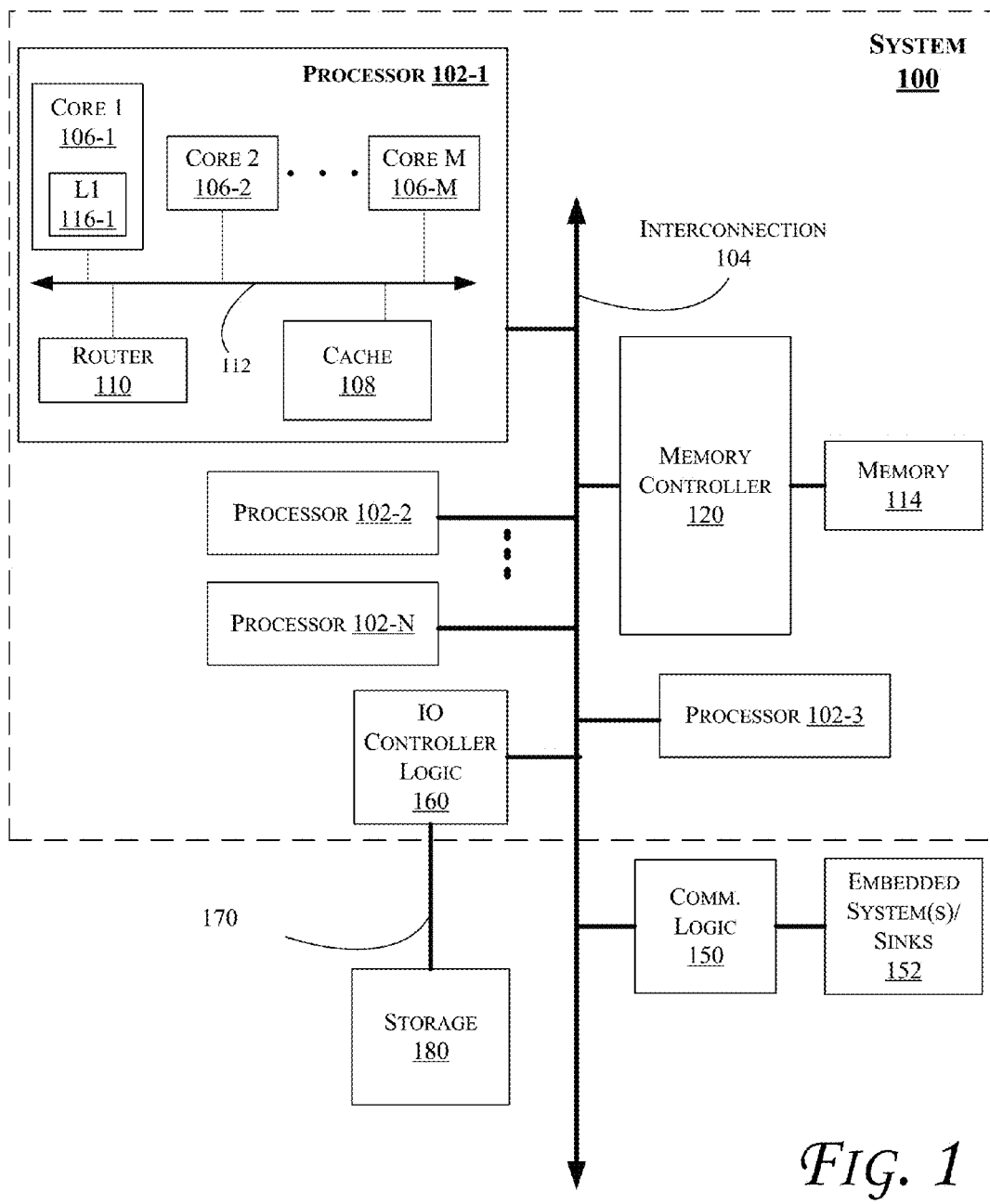

Moreover, the techniques discussed herein may be provided in various computing systems (e.g., including a mobile device such as, for example, a smartphone, tablet, UMPC (Ultra-Mobile Personal Computer), laptop computer, Ultrabook™ computing device, smart watch, smart glasses, etc.), such as those discussed with reference to FIGS. 1-13. More particularly, FIG. 1 illustrates a block diagram of a computing system 100, according to an embodiment. The system 100 includes one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 150/152, memory controllers such as those discussed with reference to FIGS. 11-13 (including NVM (Non-Volatile Memory), for example, flash memory, a Solid State Drive ("SSD", e.g., with NAND memory cells), etc.), or other components such as IO controller 160 and its interconnect 170 that enables access to one or a pool of storage device(s) 180.

In some embodiments, other types of interfaces may be used for I/O purposes (e.g., for IO controller 160 and interconnect 170). For example, Serial Attached Small Computer System Interface (SCSI) (or simply SAS and other variants such as internet SCSI (iSCSI)) or Peripheral Component Interconnect Express (PCIe) (as described in the PCI Express Base 3.0 Specification) may be used for the I/O interface. In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in (volatile and/or non-volatile) memory 114 for faster access by the components of the processor 102. As shown in FIG. 1, the memory 114 may be in communication with the processors 102 via the interconnection 104. In an embodiment, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 1, memory 114 may be coupled to other components of system 100 through memory controller 120. Storage subsystem 180 may also be accessed from an IO controller 160 via interconnect 170. System 100 also includes communication logic 150 to couple (and facilitate communication between) embedded system(s) 152 (such as a GPU (Graphics Processing Unit) or Intel® Corporation's Xeon® Phi™ platforms, also referred to herein as "sink" device) and various components of the system 100 (also referred to herein as "host" or "source" computing system), as will be further discussed herein with reference to the remaining figures. Even though logic 150 is shown to be coupled between the interconnection 104 and the embedded system(s) 152, the logic 150 may be located elsewhere, either inside system 100 or outside system 100. For example, logic 150 (or portions of it) may be provided within one of the processors 102, controller 120, etc. in various embodiments.

FIG. 2-A illustrates a block diagram of a computing system with heterogeneous IO redirect, according to an embodiment. In FIG. 2-A, the embedded system 152, sometimes referred to herein as a "sink", may run independently from the host system 100, also referred to as a "source", as in FIG. 1. Sink 152 can do IO either by using source 100 as a proxy device to access storage device(s)/pool 180; or by directly transferring data to the storage device(s)/pool 180 via its own IO connection (202). In this embodiment, as long as the transfer rate of link 150 is reasonably faster than the IO link 201 or 202, moving the data between an embedded system 152 and storage 180 destination (which can be the same or similar to the memory devices discussed herein, e.g., memory 114 of FIG. 1) via heterogeneous paths (such as path 150 plus path 201), generally referred to herein as IO "redirect", for example, through host/server 100, can outperform the IO path 202 executed by a sink node 152 due to its relatively limited IO cap abilities/throughput.

The algorithm derived in this disclosure may also be used in the configuration where the sink device does not have direct access to storage 180 (or memory 120). It can efficiently transfer the data from sink 152 to storage 180 (or memory 120) as long as Comm. Logic 150 is reasonably fast as shown in FIG. 2-B.

In various embodiments, the storage 180 includes one or more types of storage devices or memory such as those discussed herein with reference to FIGS. 1-13, including, for example, one or more of: a Network Attached Storage (NAS) device, a Storage Area Network (SAN) device, or a Direct Attached Storage (DAS) device.

Under the embodiments disclosed herein, RDMA (Remote Direct Memory Access) and active message(s) are used to achieve the goal of building the described data transfer solution (i.e., heterogeneous paths 150 plus 201) that does not require any particular storage protocol and/or any particular file system support. This can sustain competitive performance results with the flexibility to fit into many different run-time environments with minimum development cost.

As for performance considerations, existing storage solutions normally require two pieces of implementation such as an initiator vs. target (e.g., SCSI (Small Computer System Interface)) or client vs. server (NFS (Network File System) or Lustre® cluster file system). These solutions are confined by the pre-defined protocols that may lose their competitive edges over times and are difficult to adapt to new advances of hardware and/or software technologies. To this end, some embodiments described herein minimize the confinements into path 201 only. For example, an embodiment replaces a substantial portion of the overall path with interconnect link 150 that can be a few orders of magnitude better than the storage links (links 201 and 202).

Moreover, light weight, lower cost, and/or faster development cycle is provided through some embodiments. For example, an interconnect is usually one of the minimum supported features of an embedded platform vs. storage links within an embedded system that are most likely to exist in the form of emulations. To this end, an embodiment eliminates the need of such emulations inside the embedded platform. This in turn results in less software stacks, less resource requirements (cache, memory, power, etc. requirements), and/or faster and/or easier implementation.

Furthermore, heterogeneous and adaptive solutions are provided in some embodiments. For example, without the pre-defined protocol constraints, the data can be freely redirected to different storage mediums using different formats. Data can also be retrieved and converted back to its original forms more easily.

Referring to FIGS. 3-A, 3-B, and 4 (which illustrate flow diagrams of methods according to some embodiments), data operations are grouped into three categories: put, get, and control. A "put" operation creates or modifies storage objects that contain data. The storage object can be a file, a directory, a disk block, or discrete units of storage devices. A "get" operation retrieves the contents from the storage objects. A "control" operation provides an implementation-specific mechanism between source 100 and sink 152 for task synchronization. The storage objects are known and accessible by the source that performs operations via conventional methods such as file IOs or storage protocols such as NAS or SAN protocols. The "put" and "get" operations performed on a sink are packaged into active message(s) sent to the source 100 via Communications (Comm.) Logic 150 (e.g., an Ethernet Network in accordance with IEEE (Institute of Electrical and Electronics Engineers) 802.3) for actual operations. According to some embodiments, FIG. 3-A shows the flow associated with a delegated "Get" operation; FIG. 3-B shows the flow associated with a delegated "Put" operation; and FIG. 4 shows the flow associated with the complete path.

As depicted in FIGS. 3-A and 3-B, the "put" and "get" operations are delegated to the source (host) from the sink device. A delegated "get" operation (originating data from storage 180), shown in FIG. 3-A, on behalf of a sink device 152 is implemented as Storage-Read (step 1: from storage 180 to source 100), followed by an RDMA-Write (step 2: data is sent from source 100 to the embedded system 152). A delegated "put" operation, shown in FIG. 3-B, on behalf of sink 152 is implemented as a RDMA-read (step 1: data is copied from sink 152 to source 100), followed by a Storage-Write (step 2: data is sent from source 100 to storage 180). Further, the "control" operations can be performed between the sink 152 and source 100 for other synchronization purpose (for example, a lock message may be sent from source to sink to inform that no operation should be performed on a storage object until another unlock message is arrived).

Figure 4:
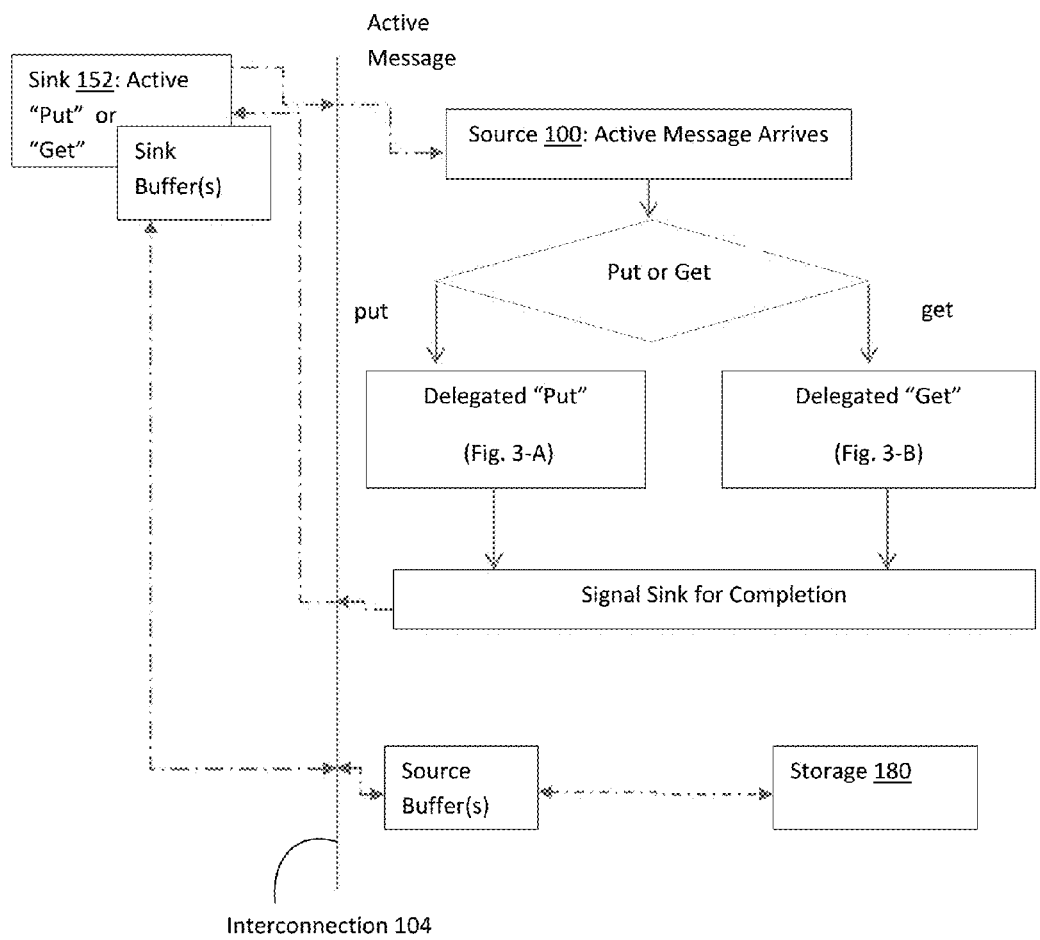

FIG. 4 shows the detailed operation (encapsulated inside or otherwise associated with an active message) is sent from sink to be operated on or executed at the source device (i.e., host/server 100) on behalf of the sender (e.g., the sink device or embedded system 152). The active message exchange (which may include the code to be executed by the embedded system or a function pointer to that code instead) between the embedded system 152 and the host/server 100 may include command (cmd), data length, buffer location(s), and/or data content. Also, a command sent to the storage 180 from the source device 100 may be converted to a storage command (such as open, seek, lock, read, and/or write). In an embodiment, the active message may be implemented using Linux® operating system RDMA completion/callback operation(s).

Figure 5:
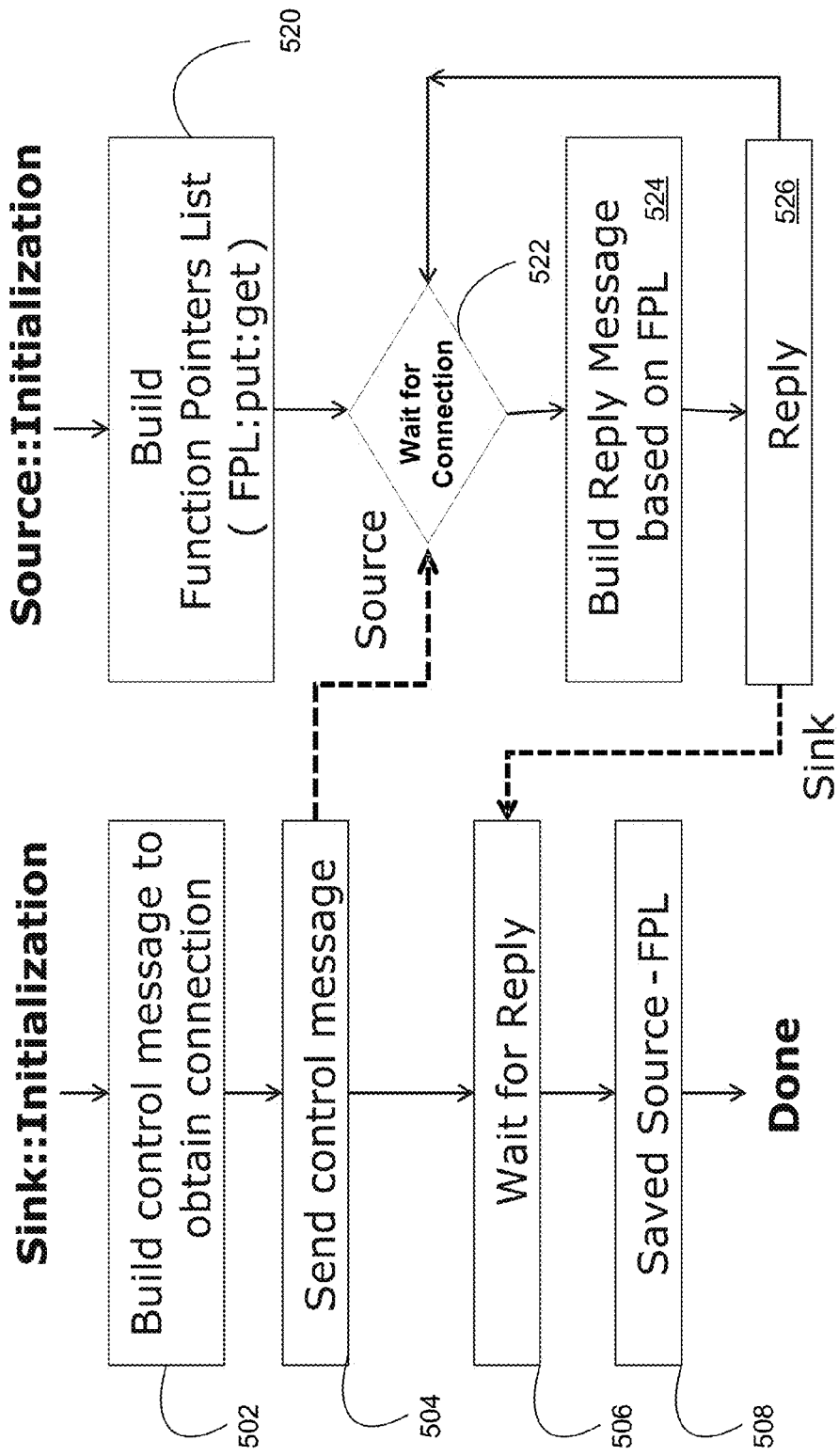

FIGS. 5-10 provide further refinements of operations discussed herein. FIG. 5 illustrates a flow diagram of a method to initialize sink and source devices, in accordance with some embodiments. In one embodiment, various components discussed with reference to FIGS. 1-4 and 11-13 may be utilized to perform one or more of the operations discussed with reference to FIG. 5. In an embodiment, one or more operations of FIG. 5 are implemented in logic (e.g., firmware), such as logic 150, embedded system(s) 152, and/or host/server 100.

Referring to FIG. 5, at an operation 502, the sink device starts initialization by generating a control message to obtain a connection and the control message is sent at an operation 504 to the source device. At operation 520, the source device starts initialization by building a Function Pointers List (or FPL which includes information/pointers regarding source device put and get functions). At an operation 522, the source waits for a connection (e.g., the control message sent from the sink device). At an operation 524, the source device builds a reply message based on FPL and subsequently sends a reply message at operation 526 to the sink device. Once the sink device receives the reply message at operation 506, it saves the source FPL at an operation 508.

Figure 6:
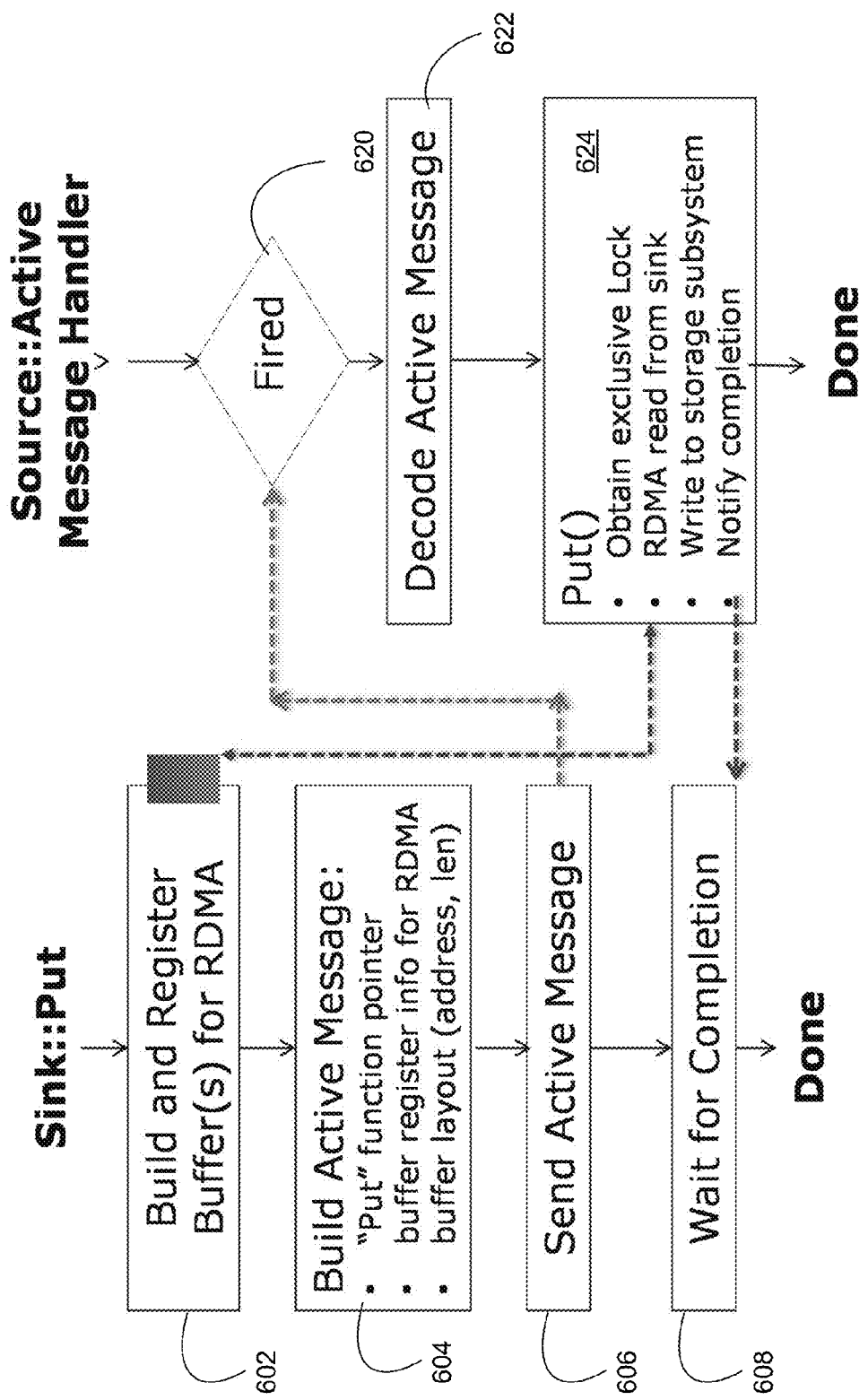
Figure 7:
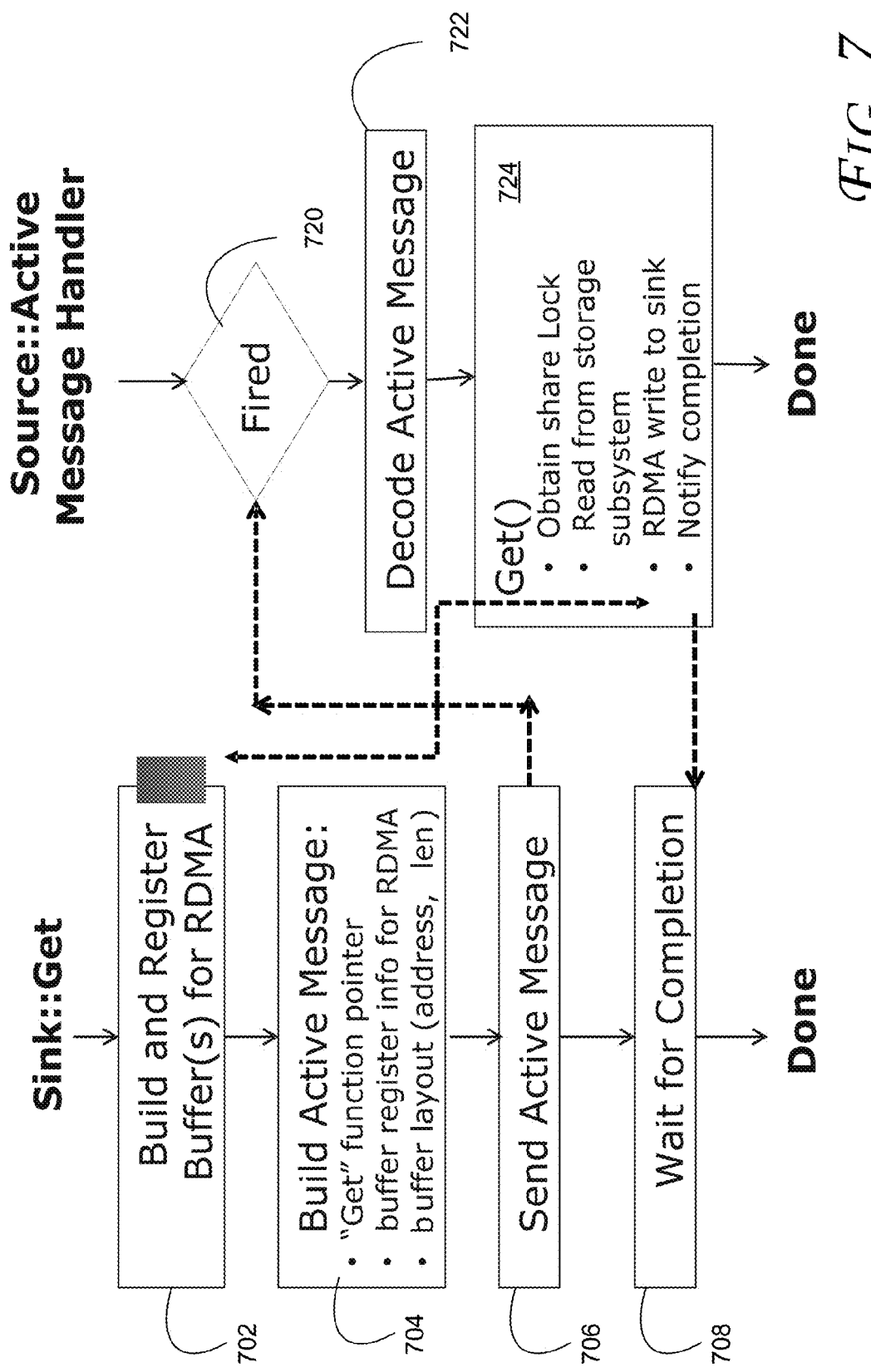

FIGS. 6 and 7 illustrate flow diagrams of methods to perform sink put and sink get functions, respectively, in accordance with some embodiments. In one embodiment, various components discussed with reference to FIGS. 1-4 and 11-13 may be utilized to perform one or more of the operations discussed with reference to FIG. 6 or 7. In an embodiment, one or more operations of FIG. 6 or 7 are implemented in logic (e.g., firmware), such as logic 150, embedded system(s) 152, and/or host/server 100. In FIGS. 6-7, upon initialization (see, FIG. 5), the sink device handshakes with the source device via "control" operations to obtain source device "put" and "get" function/operation pointers.

Referring to FIG. 6, for a "put" request triggered on a sink device, it builds/registers the data buffer for RDMA operations (operation 602), followed by packaging/generating an active message (operation 604) with memory registration information, the data buffer layout (e.g., with start address and length), together with the previously obtained "put" function pointer. The active message is subsequently sent to the source device (operation 606) and received at operation 620 by the source and decoded (operation 622). The "put" operation is executed (operation 624) at the source device by performing the corresponding RDMA-read operation (from the sink device to source device), followed by actual write operation(s) to the storage 180. At an operation 608, the sink device waits for completion of the put operation/function.

Referring to FIG. 7, for a "get" function/operation on the sink device, the sink device builds/registers the receive buffer for RDMA operation on the sink device (operation 702), followed by generating/packaging the active message (operation 704) with the memory registration information, the receive buffer layout (e.g., with start address and length), the storage meta-data, together with the previously obtained "get" function pointer. The message is then sent to the source device (operation 706) where the source device upon receipt (operation 720) and decoding the active message (operation 722) executes the request (operation 724) by reading the data from storage 180, followed by RDMA write operation(s) to the sink device buffer(s) as specified in the active messages. At an operation 708, the sink device waits for completion of the get operation/function.

Furthermore, in some embodiments, locking is in place as part of the "put" and "get" functions on the source device. It complies with the actual storage operation requirement imposed by the interaction/link between the source device and the storage subsystems 180 (e.g., POSIX (Portable Operating System Interface for Unix or another Application Program Interface (API)) lock for file IOs or NLM (Network Lock Manager) lock for NFS). In some embodiments, it is expected that a "put" operation would acquire an exclusive lock while a "get" operation would acquire a shared lock.

Figure 8:
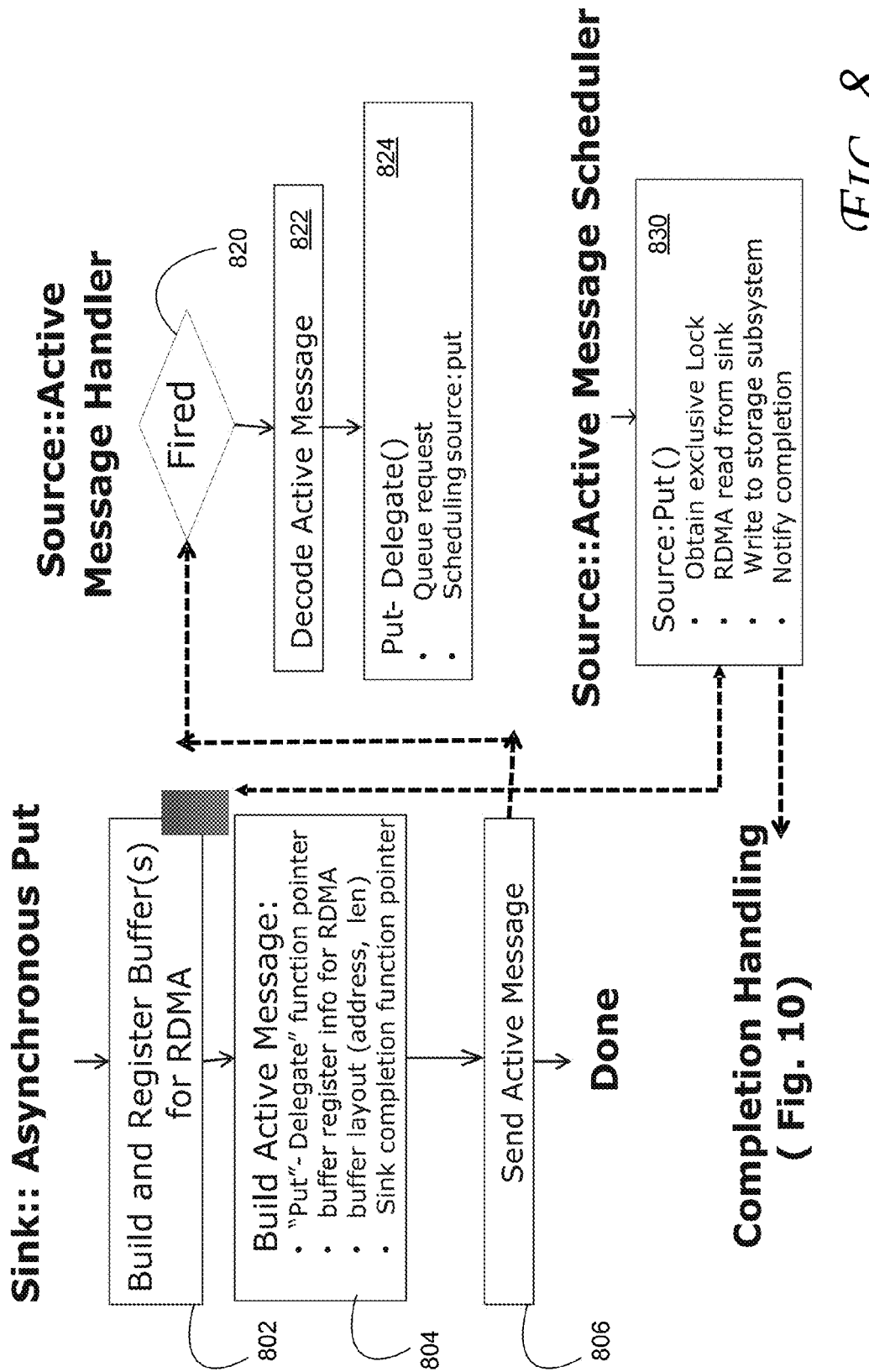
Figure 9:
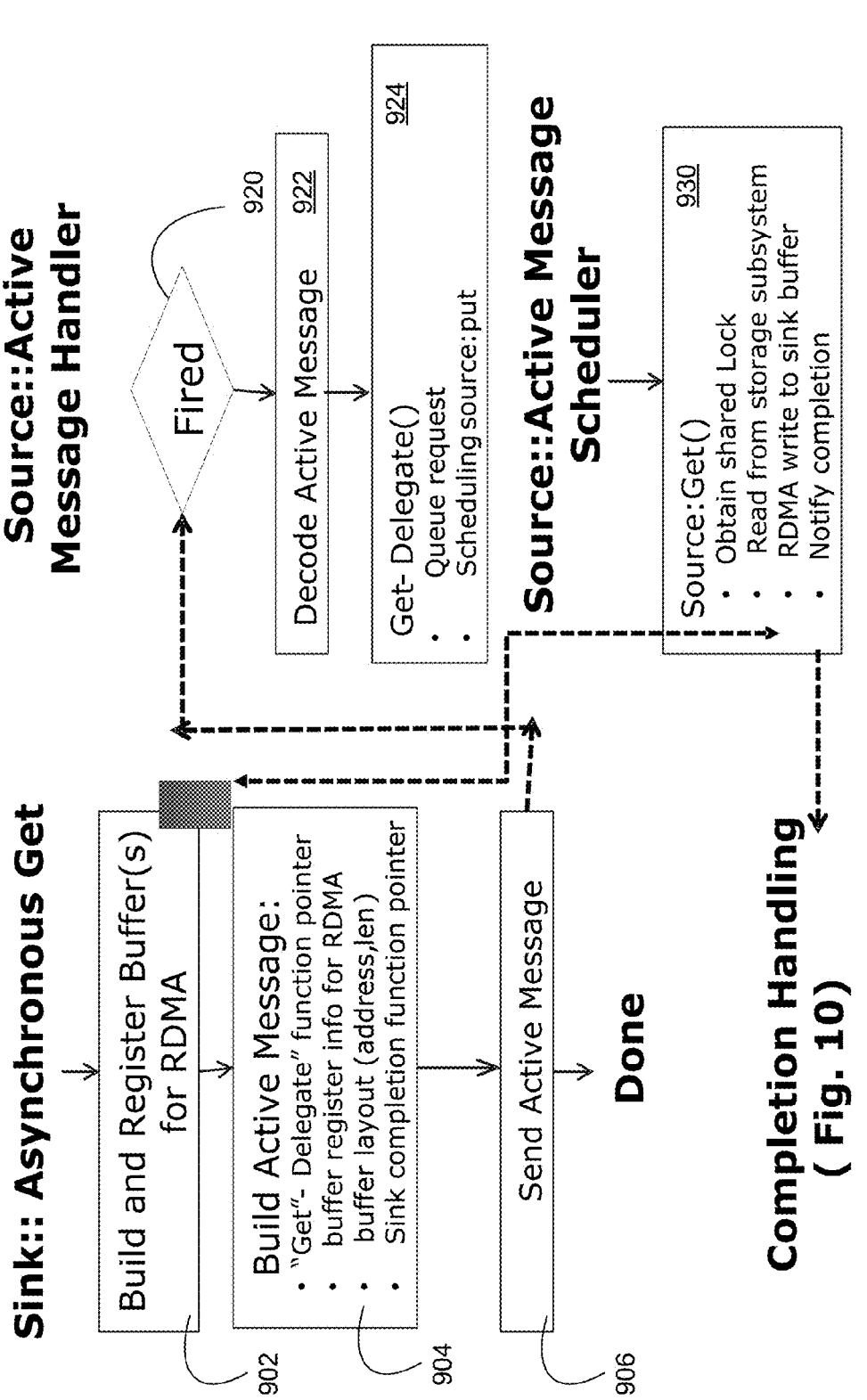

FIGS. 8 and 9 illustrate flow diagrams of methods to delegate put and get operations asynchronously (and their completion with reference to FIG. 10) in accordance with some embodiments. In one embodiment, various components discussed with reference to FIGS. 1-4 and 11-13 may be utilized to perform one or more of the operations discussed with reference to FIG. 8, 9, or 10. In an embodiment, one or more operations of FIG. 8, 9, or 10 are implemented in logic (e.g., firmware), such as logic 150, embedded system(s) 152, and/or host/server 100.

Figure 10:
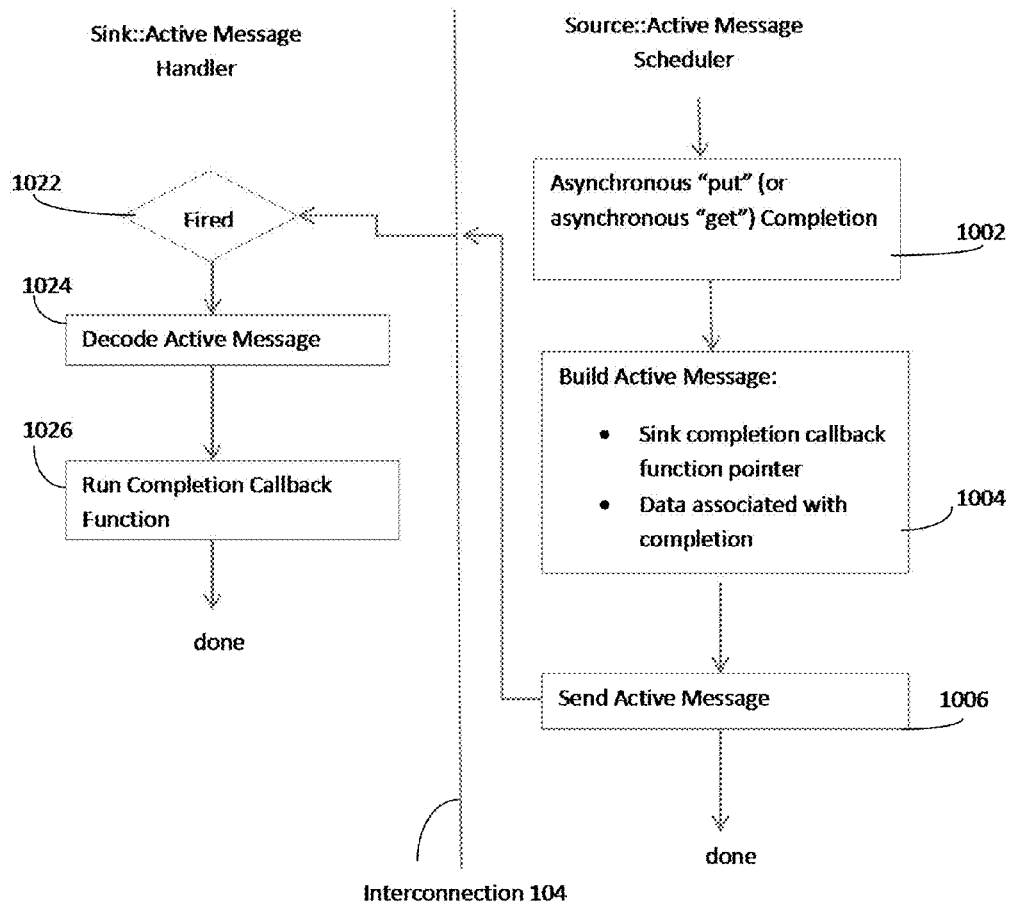

Referring to FIGS. 8-10, both "put" and "get" operations can be requested asynchronously by the source device on behalf of the sink device, if and only if a "control" operation has been placed in advance that sends the request from the sink device to the source device with the buffer registration information, the sink device buffer layout, as well as a completion callback function pointer of the sink device. More particularly, the sink device may start the delegated put operation at operation 802, build/generate an active message at an operation 804 (e.g., similar to the operations discussed with reference to operation 604), and send the active message to the source device's active message handler at operation 806. Once receive (operation 820), the active message is decoded (operation 822) and the put delegation operation is scheduled (e.g., by performing a queue request to save the request in the memory-based queue(s) and scheduling the source to perform the put operation) at operation 824. The source device's active message scheduler then schedules the put operation for execution at operation 830 (e.g., by obtaining an exclusive lock, RDMA read operation from the sink device, write operation to the storage 204, and notifying completion (see, e.g., FIG. 10)). As shown in FIG. 8, operation 830 and 802 may bi-directionally exchange information to perform their tasks.

Additionally (as shown in FIGS. 9-10), the get operation may also be delegated asynchronously. For example, the sink device may start the get operation delegation at an operation 902, generate/build an active message at an operation 904 (e.g., similar to the operations discussed with reference to operation 704), and send the active message to the source device's active message handler at operation 906. Once receive (operation 920), the active message is decoded (operation 922) and the get delegation operation is scheduled (e.g., by performing a queue request to save the request in the memory-based queue(s) and scheduling the source to perform the get operation) at operation 924. The source device's active message scheduler then schedules the get operation for execution at operation 930 (e.g., by obtaining a shared lock, reading from the storage 180, RDMA write operation to the sink device buffer, and notifying completion (see, e.g., FIG. 10)). As shown in FIG. 9, operation 930 and 902 may bi-directionally exchange information to perform their tasks.

As for completion handling mentioned with reference to FIGS. 8 and 9, FIG. 10 illustrates the operations associated with the completion handling, according to an embodiment. As illustrated in FIG. 10, upon the completion of an asynchronous "put" or an asynchronous "get" at operation 1002, the active message scheduler of the source device performs operation 1004 that builds/generates an active message (e.g., using a sink device completion callback function and data associated with completion). The active message is sent at operation 1006 to the sink device's active message handler. The sink device's active message handler detects receipt of the active message from the source device at operation 1022. The active message is decoded at operation 1024. At operation 1026, the completion callback function is subsequently run.

Some embodiments can be built on top of a coprocessor and its host system such as Intel Xeon Phi platform where a Coprocessor Offload Infrastructure (COI) API extension may be provided that allows data residing on Xeon Phi platform to be efficiently moved between its host computing system (e.g., computing systems discussed with reference to FIGS. 1-4 and 11-13), the physical storage (e.g., storage device(s)/pool 180), and Xeon Phi itself. Hence, contrary to MPI (Message Passing Interface) IOs that are normally based on relatively bulky and expensive cluster file systems, the COI extension can be extremely light-weight. Further, such embodiments do not require any specific file system support. Further addressing existing shortcomings, during run time, the old approaches can also consume sizeable Xeon Phi resources in terms of buffer cache (memory), power consumption, as well as handshaking protocol overheads. Other than providing improvements to the existing product lines in terms of product quality as well as development cost, such light-weight embodiments can be easily tailored to vast amount of different run-time environments without being tied to any specific storage hardware/software configurations. Also, their inherent heterogeneity allows for a vast amount of divergent source devices, sink devices, as well as storage device(s)/pools to enable data flow regardless their individual configurations. This may become particularly relevant for HPC (High Performance Computing) products that may significantly advance the interconnect link speed for large scale clusters that can easily outpace their storage setup(s).

Figure 11:
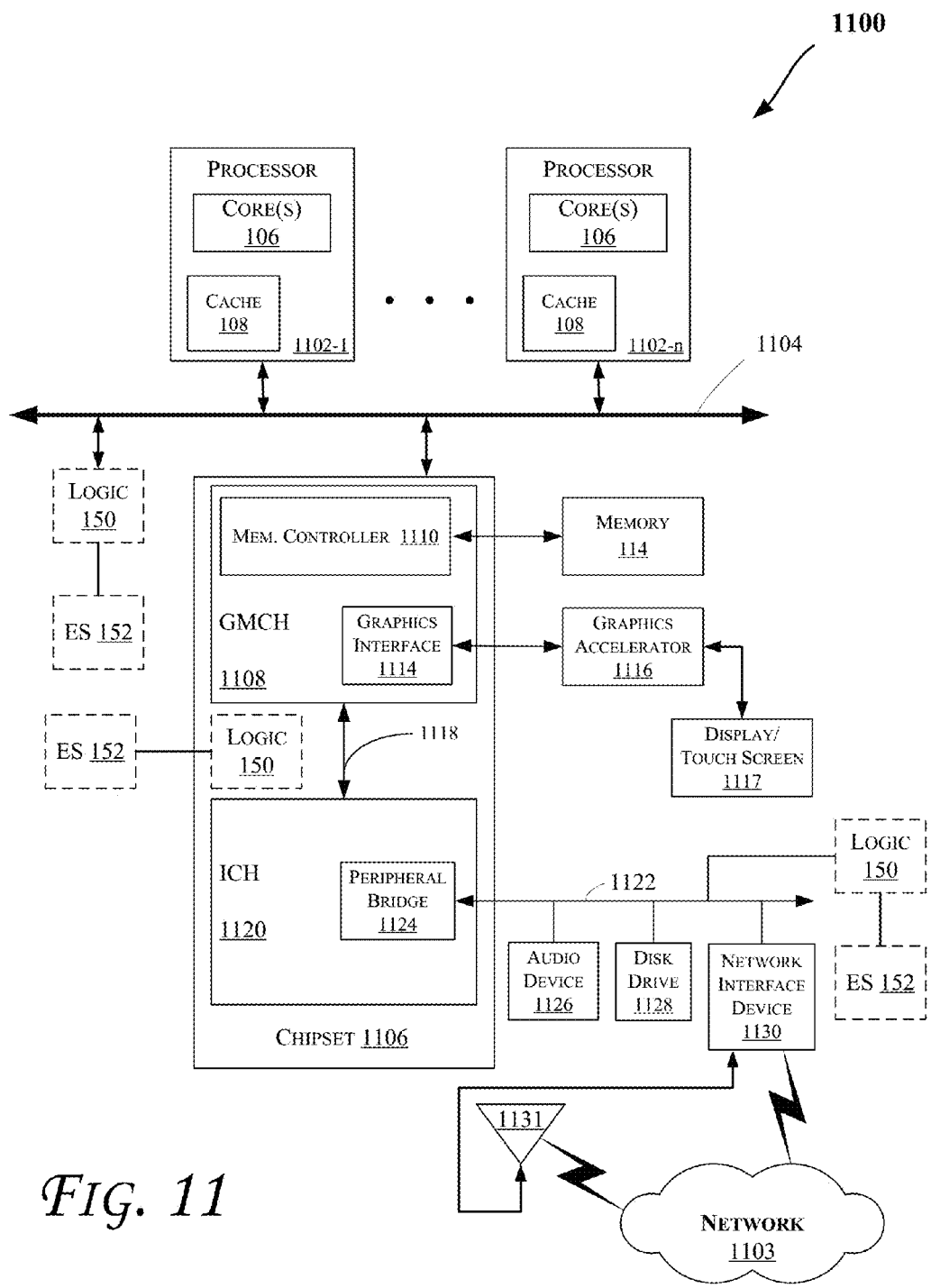

FIG. 11 illustrates a block diagram of a computing system 1100 in accordance with an embodiment of the invention. The computing system 1100 may include one or more central processing unit(s) (CPUs) 1102 or processors that communicate via an interconnection network (or bus) 1104. The processors 1102 may include a general purpose processor, a network processor (that processes data communicated over a computer network 1103), an application processor (such as those used in cell phones, smart phones, etc.), or other types of a processor (including a reduced instruction set computer (RISC) processor or a complex instruction set computer (CISC)). Various types of computer networks 1103 may be utilized including wired (e.g., Ethernet, Gigabit, Fiber, etc.) or wireless networks (such as cellular, 3G (Third-Generation Cell-Phone Technology or 3rd Generation Wireless Format (UWCC)), 4G ($4^{th}$ Generation (wireless/mobile communications)), Low Power Embedded (LPE), etc.). Moreover, the processors 1102 may have a single or multiple core design. The processors 1102 with a multiple core design may integrate different types of processor cores on the same integrated circuit (IC) die. Also, the processors 1102 with a multiple core design may be implemented as symmetrical or asymmetrical multiprocessors.

In an embodiment, one or more of the processors 1102 may be the same or similar to the processors 102 of FIG. 1. For example, one or more of the processors 1102 may include one or more of the cores 106 and/or cache 108. Also, the operations discussed with reference to FIGS. 1-10 may be performed by one or more components of the system 1100.

A chipset 1106 may also communicate with the interconnection network 1104. The chipset 1106 may include a graphics and memory control hub (GMCH) 1108. The GMCH 1108 may include a memory controller 1110 (which may be the same or similar to the memory controller 120 of FIG. 1 in an embodiment) that communicates with the memory 114. System 1100 may also include logic 150 (e.g., coupled to embedded system(s) 152) in various locations (such as those shown in FIG. 11 but can be in other locations within system 1100 (not shown)). The memory 114 may store data, including sequences of instructions that are executed by the CPU 1102, or any other device included in the computing system 1100. In one embodiment of the invention, the memory 114 may include one or more volatile/non-volatile storage (or memory) devices such as random access memory (RAM), dynamic RAM (DRAM), synchronous DRAM (SDRAM), static RAM (SRAM), or other types of storage devices such as a hard disk, nanowire memory, Ferro-electric transistor random access memory (FeTRAM), magnetoresistive random access memory (MRAM), flash memory, Spin Torque Transfer Random Access Memory (STTRAM), Resistive Random Access Memory, 3D Cross Point Memory such as PCM (Phase Change Memory), an SSD with NAND/NOR memory, etc. Additional devices may communicate via the interconnection network 1104, such as multiple CPUs and/or multiple system memories.

The GMCH 1108 may also include a graphics interface 1114 that communicates with a graphics accelerator 1116. In one embodiment of the invention, the graphics interface 1114 may communicate with the graphics accelerator 1116 via an accelerated graphics port (AGP) or Peripheral Component Interconnect (PCI) (or PCI express (PCIe) interface). In an embodiment of the invention, a display 1117 (such as a flat panel display, touch screen, etc.) may communicate with the graphics interface 1114 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display 1117.

A hub interface 1118 may allow the GMCH 1108 and an input/output control hub (ICH) 1120 to communicate. The ICH 1120 may provide an interface to I/O devices that communicate with the computing system 1100. The ICH 1120 may communicate with a bus 1122 through a peripheral bridge (or controller) 1124, such as a peripheral component interconnect (PCI) bridge, a universal serial bus (USB) controller, or other types of peripheral bridges or controllers. The bridge 1124 may provide a data path between the CPU 1102 and peripheral devices. Other types of topologies may be utilized. Also, multiple buses may communicate with the ICH 1120, e.g., through multiple bridges or controllers. Moreover, other peripherals in communication with the ICH 1120 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 1122 may communicate with an audio device 1126, one or more disk drive(s) 1128, and a network interface device 1130 (which is in communication with the computer network 1103, e.g., via a wired or wireless interface). As shown, the network interface device 1130 may be coupled to an antenna 1131 to wirelessly (e.g., via an Institute of Electrical and Electronics Engineers (IEEE) 802.11 interface (including IEEE 802.11a/b/g/n, etc.), cellular interface, 3G, 11G, LPE, etc.) communicate with the network 1103. Other devices may communicate via the bus 1122. Also, various components (such as the network interface device 1130) may communicate with the GMCH 1108 in some embodiments. In addition, the processor 1102 and the GMCH 1108 may be combined to form a single chip. Furthermore, the graphics accelerator 1116 may be included within the GMCH 1108 in other embodiments.

Furthermore, the computing system 1100 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 1128), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 12:
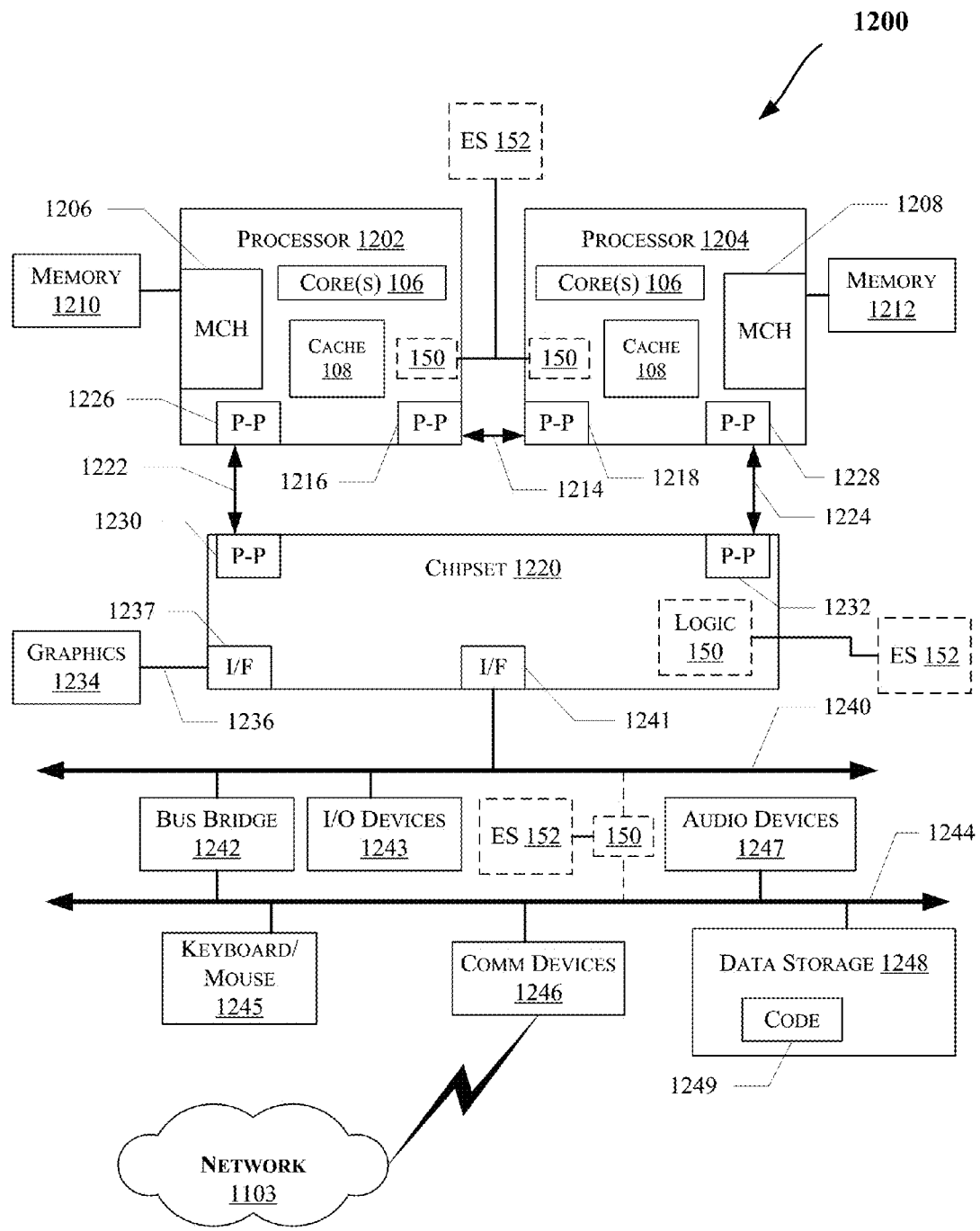

FIG. 12 illustrates a computing system 1200 that is arranged in a point-to-point (PtP) configuration, according to an embodiment. In particular, FIG. 12 shows a system where processors, memory, and input/output devices are interconnected by a number of point-to-point interfaces. The operations discussed with reference to FIGS. 1-11 may be performed by one or more components of the system 1200.

As illustrated in FIG. 12, the system 1200 may include several processors, of which only two, processors 1202 and 1204 are shown for clarity. The processors 1202 and 1204 may each include a local memory controller hub (MCH) 1206 and 1208 to enable communication with memories 1210 and 1212. The memories 1210 and/or 1212 may store various data such as those discussed with reference to the memory 114 of FIGS. 1 and/or 11. Also, MCH 1206 and 1208 may include the memory controller 120 and/or logic 150 of FIG. 1 in some embodiments.

In an embodiment, the processors 1202 and 1204 may be one of the processors 1102 discussed with reference to FIG. 11. The processors 1202 and 1204 may exchange data via a point-to-point (PtP) interface 1214 using PtP interface circuits 1216 and 1218, respectively. Also, the processors 1202 and 1204 may each exchange data with a chipset 1220 via individual PtP interfaces 1222 and 1224 using point-to-point interface circuits 1226, 1228, 1230, and 1232. The chipset 1220 may further exchange data with a high-performance graphics circuit 1234 via a high-performance graphics interface 1236, e.g., using a PtP interface circuit 1237. As discussed with reference to FIG. 11, the graphics interface 1236 may be coupled to a display device (e.g., display 1117) in some embodiments.

As shown in FIG. 12, one or more of the cores 106 and/or cache 108 of FIG. 1 may be located within the processors 1202 and 1204. Other embodiments, however, may exist in other circuits, logic units, or devices within the system 1200 of FIG. 12. Furthermore, other embodiments may be distributed throughout several circuits, logic units, or devices illustrated in FIG. 12.

The chipset 1220 may communicate with a bus 1240 using a PtP interface circuit 1241. The bus 1240 may have one or more devices that communicate with it, such as a bus bridge 1242 and I/O devices 1243. Via a bus 1244, the bus bridge 1242 may communicate with other devices such as a keyboard/mouse 1245, communication devices 1246 (such as modems, network interface devices, or other communication devices that may communicate with the computer network 1103, as discussed with reference to network interface device 1130 for example, including via antenna 1131), audio I/O device, and/or a data storage device 1248. The data storage device 1248 may store code 1249 that may be executed by the processors 1202 and/or 1204.

Figure 13:
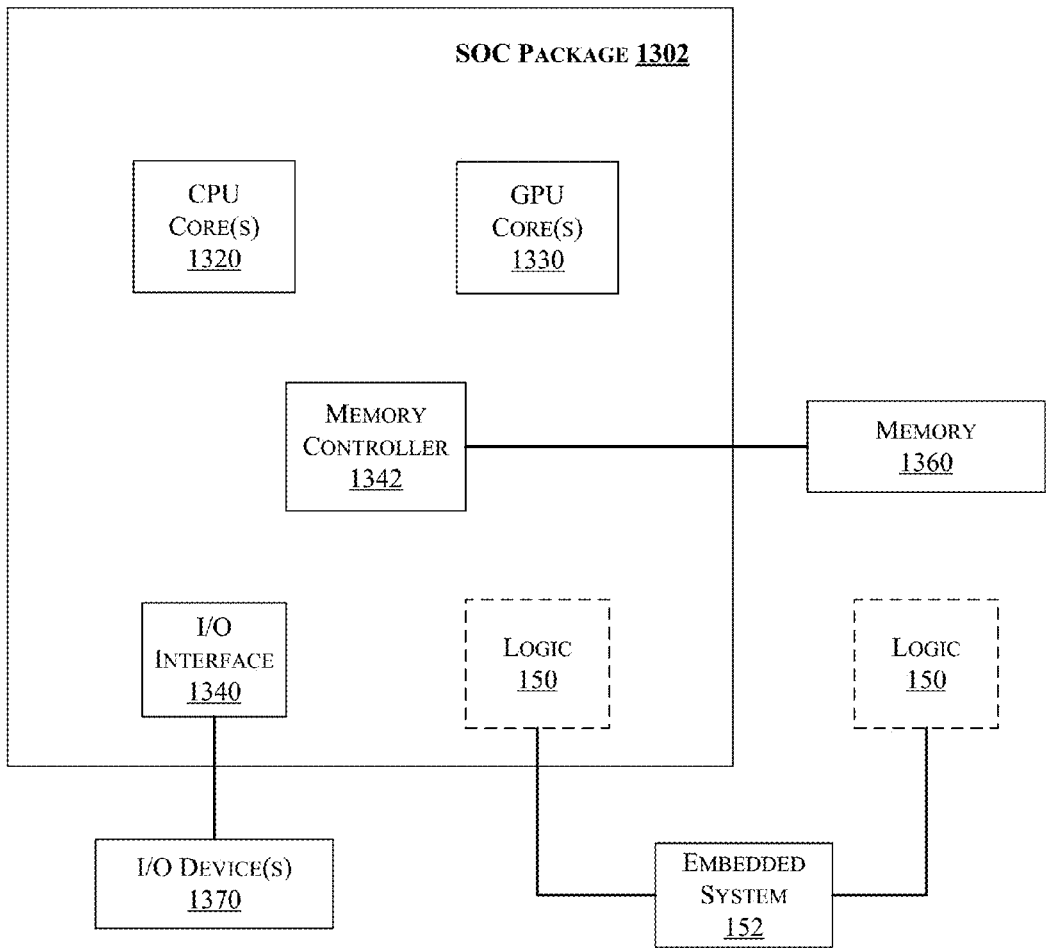

In some embodiments, one or more of the components discussed herein can be embodied on a System On Chip (SOC) device. FIG. 13 illustrates a block diagram of an SOC package in accordance with an embodiment. As illustrated in FIG. 13, SOC 1302 includes one or more Central Processing Unit (CPU) cores 1320, one or more Graphics Processor Unit (GPU) cores 1330, an Input/Output (I/O) interface 1340, and a memory controller 1342. Various components of the SOC package 1302 may be coupled to an interconnect or bus such as discussed herein with reference to the other figures. Also, the SOC package 1302 may include more or less components, such as those discussed herein with reference to the other figures. Further, each component of the SOC package 1320 may include one or more other components, e.g., as discussed with reference to the other figures herein. In one embodiment, SOC package 1302 (and its components) is provided on one or more Integrated Circuit (IC) die, e.g., which are packaged onto a single semiconductor device.

As illustrated in FIG. 13, SOC package 1302 is coupled to a memory 1360 (which may be similar to or the same as memory discussed herein with reference to the other figures) via the memory controller 1342. In an embodiment, the memory 1360 (or a portion of it) can be integrated on the SOC package 1302.

The I/O interface 1340 may be coupled to one or more I/O devices 1370, e.g., via an interconnect and/or bus such as discussed herein with reference to other figures. I/O device(s) 1370 may include one or more of a keyboard, a mouse, a touchpad, a display, an image/video capture device (such as a camera or camcorder/video recorder), a touch screen, a speaker, or the like. Furthermore, SOC package 1302 may include/integrate the logic 150 in an embodiment. Alternatively, the logic 150 may be provided outside of the SOC package 1302 (i.e., as a discrete logic).

The following examples pertain to further embodiments. Example 1 includes 1 an apparatus comprising: logic to couple an embedded system to a storage device via a source device, wherein the embedded system and the storage device are to exchange information over a first link and a second link instead of a third link in response to a transfer rate of the first link, coupled between the embedded system and the source device, being faster than a transfer rate of the second link, coupled between the source device and the storage device, wherein the third link is capable to directly couple the embedded system and the storage device. Example 2 includes the apparatus of example 1, wherein the embedded system and the storage device are to exchange information via the source device based at least in part on one or more of an RDMA (Remote Direct Memory Access) message or an active message. Example 3 includes the apparatus of example 2, wherein the active message is a messaging object capable of performing processing on its own. Example 4 includes the apparatus of example 1, wherein the embedded system and the storage device are to exchange information via the source device in one of an active mode or a passive mode. Example 5 includes the apparatus of example 4, wherein the active mode is to operate on data at the source device under a context of a calling process. Example 6 includes the apparatus of example 4, wherein the passive mode is cause transmission of data, associated with an active message, that is to be operated on at the source device on behalf of the embedded system. Example 7 includes the apparatus of example 1, wherein the embedded system is to comprise one of a graphics processing unit platform or a co-processor offload infrastructure platform. Example 8 includes the apparatus of example 1, wherein the storage device is to comprise one or more of: a Network Attached Storage (NAS) device, a Storage Area Network (SAN) device, or a Direct Attached Storage (DAS) device. Example 9 includes the apparatus of example 1, wherein the source device is to comprise a host computing system or a computer server. Example 10 includes the apparatus of example 1, wherein one or more processor cores are coupled to the storage device to access information stored in the storage device. Example 11 includes the apparatus of example 1, wherein one or more of the logic, one or more processor cores, and memory are on a same integrated circuit die. Example 12 includes the apparatus of example 1, wherein the embedded system and the storage device are to exchange information via the source device based at least in part on one or more of an RDMA (Remote Direct Memory Access) message or an active message over a communications protocol.

Example 13 includes a method comprising: exchanging information between an embedded system and a storage device via a source device, wherein the embedded system and the storage device exchange information over a first link and a second link instead of a third link in response to a transfer rate of the first link, coupled between the embedded system and the source device, being faster than a transfer rate of the second link, coupled between the source device and the storage device, wherein the third link is capable to directly couple the embedded system and the storage device. Example 14 includes the method of example 13, further comprising the embedded system and the storage device exchanging information via the source device based at least in part on one or more of an RDMA (Remote Direct Memory Access) message or an active message. Example 15 includes the method of example 14, wherein the active message is a messaging object capable of performing processing on its own. Example 16 includes the method of example 13, further comprising the embedded system and the storage device exchanging information via the source device in one of an active mode or a passive mode. Example 17 includes the method of example 16, wherein the active mode operates on data at the source device under a context of a calling process. Example 18 includes the method of example 16, wherein the passive mode causes transmission of data, associated with an active message, that is to be operated on at the source device on behalf of the embedded system. Example 19 includes the method of example 13, wherein the embedded system comprises one of a graphics processing unit platform or a co-processor offload infrastructure platform. Example 20 includes the method of example 13, wherein the storage device comprises one or more of: a Network Attached Storage (NAS) device, a Storage Area Network (SAN) device, or a Direct Attached Storage (DAS) device. Example 21 includes the method of example 13, wherein the source device comprises a host computing system or a computer server.

Example 22 includes a computer-readable medium comprising one or more instructions that when executed on a processor configure the processor to perform one or more operations to: exchange information between an embedded system and a storage device via a source device, wherein the embedded system and the storage device exchange information over a first link and a second link instead of a third link in response to a transfer rate of the first link, coupled between the embedded system and the source device, being faster than a transfer rate of the second link, coupled between the source device and the storage device, wherein the third link is capable to directly couple the embedded system and the storage device. Example 23 includes the computer-readable medium of example 22, further comprising one or more instructions that when executed on the processor configure the processor to perform one or more operations to cause the embedded system and the storage device to exchange information via the source device based at least in part on one or more of an RDMA (Remote Direct Memory Access) message or an active message. Example 24 includes the computer-readable medium of example 22, wherein the active message is a messaging object capable of performing processing on its own. Example 25 includes the computer-readable medium of example 22, further comprising one or more instructions that when executed on the processor configure the processor to perform one or more operations to cause the embedded system and the storage device to exchange information via the source device in one of an active mode or a passive mode. Example 26 includes the computer-readable medium of example 22, wherein the active mode operates on data at the source device under a context of a calling process, or wherein the passive mode causes transmission of data, associated with an active message, that is to be operated on at the source device on behalf of the embedded system.

Example 27 includes an apparatus comprising means to perform a method as set forth in any preceding example.

Example 28 includes machine-readable storage including machine-readable instructions, when executed, to implement a method or realize an apparatus as set forth in any preceding example.

In various embodiments, the operations discussed herein, e.g., with reference to FIGS. 1-13, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-13.

Additionally, such tangible computer-readable media may be downloaded as a computer program product, wherein the program may be transferred from a remote computer (e.g., a server) to a requesting computer (e.g., a client) by way of data signals (such as in a carrier wave or other propagation medium) via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic to couple an embedded system to a storage device via a source device,
   wherein the embedded system and the storage device are to exchange information over a first physical link and a second physical link instead of a third physical link in response to a determination that a combination of a transfer rate of the first physical link, coupled between the embedded system and the source device, and a transfer rate of the second physical link, coupled between the source device and the storage device, being faster than a transfer rate of the third physical link, wherein the third physical link is capable to directly couple the embedded system and the storage device, wherein the embedded system and the storage device are to exchange information via the source device based at least in part on one or more of an RDMA (Remote Direct Memory Access) message or an active message.

2. The apparatus of claim 1, wherein the active message is a messaging object capable of performing processing on its own.

3. The apparatus of claim 1, wherein the embedded system and the storage device are to exchange information via the source device in one of an active mode or a passive mode.

4. The apparatus of claim 3, wherein the active mode is to operate on data at the source device under a context of a calling process.

5. The apparatus of claim 3, wherein the passive mode is cause transmission of data, associated with an active message, that is to be operated on at the source device on behalf of the embedded system.

6. The apparatus of claim 1, wherein the embedded system is to comprise one of a graphics processing unit platform or a co-processor offload infrastructure platform.

7. The apparatus of claim 1, wherein the storage device is to comprise one or more of: a Network Attached Storage (NAS) device, a Storage Area Network (SAN) device, or a Direct Attached Storage (DAS) device.

8. The apparatus of claim 1, wherein the source device is to comprise a host computing system or a computer server.

9. The apparatus of claim 1, wherein one or more processor cores are coupled to the storage device to access information stored in the storage device.

10. The apparatus of claim 1, wherein one or more of the logic, one or more processor cores, and memory are on a same integrated circuit die.

11. The apparatus of claim 1, wherein the embedded system and the storage device are to exchange information via the source device based at least in part on one or more of the RDMA (Remote Direct Memory Access) message or the active message over a communications protocol.

12. A method comprising:
    exchanging information between an embedded system and a storage device via a source device,
    wherein the embedded system and the storage device exchange information over a first physical link and a second physical link instead of a third physical link in response to a determination that a combination of a transfer rate of the first physical link, coupled between the embedded system and the source device, and a transfer rate of the second physical link, coupled between the source device and the storage device, being faster than a transfer rate of the third physical link, wherein the third physical link is capable to directly couple the embedded system and the storage device, wherein the embedded system and the storage device exchange information via the source device based at least in part on one or more of an RDMA (Remote Direct Memory Access) message or an active message.

13. The method of claim 12, wherein the active message is a messaging object capable of performing processing on its own.

14. The method of claim 12, further comprising the embedded system and the storage device exchanging information via the source device in one of an active mode or a passive mode.

15. The method of claim 14, wherein the active mode operates on data at the source device under a context of a calling process.

16. The method of claim 14, wherein the passive mode causes transmission of data, associated with an active message, that is to be operated on at the source device on behalf of the embedded system.

17. The method of claim 12, wherein the embedded system comprises one of a graphics processing unit platform or a co-processor offload infrastructure platform.

18. The method of claim 12, wherein the storage device comprises one or more of: a Network Attached Storage (NAS) device, a Storage Area Network (SAN) device, or a Direct Attached Storage (DAS) device.

19. The method of claim 12, wherein the source device comprises a host computing system or a computer server.

20. A non-transitory computer-readable medium comprising one or more instructions that when executed on a processor configure the processor to perform one or more operations to:
  exchange information between an embedded system and a storage device via a source device,
  wherein the embedded system and the storage device exchange information over a first physical link and a second physical link instead of a third physical link in response to a determination that a combination of a transfer rate of the first physical link, coupled between the embedded system and the source device, and a transfer rate of the second physical link, coupled between the source device and the storage device, being faster than a transfer rate of the third physical link, wherein the third physical link is capable to directly couple the embedded system and the storage device, wherein the embedded system and the storage device exchange information via the source device based at least in part on one or more of an RDMA (Remote Direct Memory Access) message or an active message.

21. The non-transitory computer-readable medium of claim 20, wherein the active message is a messaging object capable of performing processing on its own.

22. The non-transitory computer-readable medium of claim 20, further comprising one or more instructions that when executed on the processor configure the processor to perform one or more operations to cause the embedded system and the storage device to exchange information via the source device in one of an active mode or a passive mode.

* * * * *